United States Patent
Tanigawa et al.

(10) Patent No.: US 6,322,058 B1
(45) Date of Patent: Nov. 27, 2001

(54) AIR SUSPENSION APPARATUS

(75) Inventors: Fujio Tanigawa; Akimasa Amemiya, both of Kanagawa-ken (JP)

(73) Assignee: Tokico Ltd., Kanagawa-Ken (JP)

( * ) Notice: Subject to any disclaimer, the term of this patent is extended or adjusted under 35 U.S.C. 154(b) by 0 days.

(21) Appl. No.: 09/468,305

(22) Filed: Dec. 21, 1999

(30) Foreign Application Priority Data

Dec. 21, 1998 (JP) .................................................. 10-363383

(51) Int. Cl.$^7$ .................................................. B65H 59/16
(52) U.S. Cl. .................................. 267/65.15; 267/65.19; 188/269
(58) Field of Search ................. 267/65.15, 65.19, 267/65.21, 65.23, 65.24, 65.25, 122, 123, 217; 188/269, 298

(56) References Cited

U.S. PATENT DOCUMENTS

| | | | |
|---|---|---|---|
| 1,733,467 | * 10/1929 | O'Neill | 267/64.15 |
| 3,582,106 | * 6/1971 | Keijzer | 280/124 |
| 4,010,829 | * 3/1977 | Naito et al. | 188/278 |
| 4,200,270 | * 4/1980 | Merkle | 267/65 B |
| 4,214,775 | * 7/1980 | Taft | 280/708 |
| 4,234,172 | * 11/1980 | Takahashi | 267/8 R |
| 4,743,000 | * 5/1988 | Karnopp | 267/218 |
| 5,052,712 | * 10/1991 | Raidel | 280/702 |
| 6,068,245 | * 5/2000 | Roper | 267/64.15 |

FOREIGN PATENT DOCUMENTS

| | | | |
|---|---|---|---|
| 2161579-A | * 1/1986 | (GB) | 267/64.15 |
| 57-205208 | 12/1982 | (JP) . | |
| 60-38220-A | * 2/1985 | (JP) | 164/55.1 |
| 63-152740-A | * 6/1988 | (JP) | 188/269 |
| 3-134334-A | * 6/1991 | (JP) | 188/314 |

* cited by examiner

Primary Examiner—Matthew C. Graham
Assistant Examiner—Xuan Lan Nguyen
(74) Attorney, Agent, or Firm—Wenderoth, Lind & Ponack, L.L.P.

(57) ABSTRACT

A pressure-receiving chamber in an actuator and an air chamber of an air spring for displacing a shutter in a piston rod communicate with other through an air passage provided in the piston rod. The air passage includes a small-diameter hole of a rod insertion hole in the piston rod and an air hole formed in a side wall of the piston rod. By this arrangement, an external pipe such as used in a conventional air suspension apparatus for enabling communication between the actuator and the air spring becomes unnecessary, and the pressure in the air chamber is introduced into the pressure-receiving chamber in the actuator through the air passage in the piston rod. Therefore, a problem such as leakage of air can be avoided, leading to a reduction in the number of necessary parts.

25 Claims, 5 Drawing Sheets

AIR SUSPENSION APPARATUS

BACKGROUND OF THE INVENTION

The present invention relates to an air suspension apparatus which is advantageously used for, for example, a suspension apparatus for a vehicle.

Generally, an air suspension apparatus mainly comprises a hydraulic shock absorber for generating a damping force for damping vibration, following extension and compression strokes of a piston rod and an air spring provided on an outer circumferential side of the hydraulic shock absorber so as to define an air chamber in which compressed air is sealably contained. The air spring biases the piston rod of the hydraulic shock absorber in a direction of extension.

Further, a suspension apparatus capable of controlling a damping force in accordance with variations in vehicle weight has been known [reference is made to, for example, Unexamined Japanese Patent Application Public Disclosure (Kokai) No. 57-205208].

The air suspension apparatus of Kokai No. 57-205208 mainly comprises: a cylinder; a piston slidably provided in the cylinder so as to divide an interior of the cylinder into two oil chambers; a piston rod having a proximal end portion thereof fixed to the piston and a distal end portion thereof protruding to the outside of the cylinder, the piston rod including an axial rod insertion hole; a hydraulic fluid passage formed in the piston rod so as to enable communication between the two oil chambers in the cylinder; a shutter slidably provided at a position in the hydraulic fluid passage for varying a flow path area of the hydraulic fluid passage to adjust a damping force; an actuator provided at the protruding end portion of the piston rod so as to operate the shutter; a transmission rod axially extending in the rod insertion hole in the piston rod so as to transmit an operating force of the actuator to the shutter; and an air spring provided between the cylinder and the protruding end portion of the piston rod so as to bias the piston rod in a direction of extension, the air spring including an air chamber in which compressed air is sealably contained.

The actuator includes a movable inner wall provided therein so as to define a pressure-receiving chamber for receiving air pressure. Movement of the movable inner wall is transmitted to the transmission rod through a cam member or the like. Further, an external pipe is provided between the pressure-receiving chamber in the actuator and the air chamber in the air spring so that the pressure of air in the air chamber is introduced into the pressure-receiving chamber through the external pipe.

The pressure in the air chamber varies, depending on the load (luggage or the like) carried by a vehicle. This pressure existing in the air chamber is introduced through the external pipe into the pressure-receiving chamber in the actuator, thus displacing the movable inner wall according to a change in pressure in the pressure-receiving chamber. Movement of the movable inner wall is transmitted from the transmission rod through the cam member or the like to the shutter. Consequently, the shutter slidably moves, to thereby change the flow path area of the hydraulic fluid passage, so that a damping force is varied automatically in accordance with the weight of the vehicle.

However, in the above-mentioned air suspension apparatus, the air chamber in the air spring and the pressure-receiving chamber in the actuator communicate with each other through the external pipe. Thus, there is a possibility of the occurrence of air leakage due to connection failure or breakage of the external pipe. This leads to a lowering of durability and reliability of the air suspension apparatus.

Further, when the external pipe is used, it is necessary to provide connecting holes for use in connecting the external pipe to the air spring and the actuator. Therefore, the number of necessary parts becomes large and a cumbersome operation for piping is necessary, leading to low productivity and high cost.

SUMMARY OF THE INVENTION

In view of the above situation regarding conventional air suspension apparatuses, the present invention has been made. It is an object of the present invention to provide an air suspension apparatus which is capable of introducing air pressure in the air chamber into the actuator without the need to use an external pipe. As a result, the air suspension apparatus of the present invention has high durability and reliability, and enables a reduction in the number of necessary parts thus facilitating easy assembly.

The present invention provides an air suspension apparatus comprising a cylinder, a piston, a piston rod, a fluid passage, a damping force adjusting mechanism, an actuator, a transmission rod, and an air spring.

The piston is slidably provided in the cylinder so as to divide an interior of the cylinder into two oil chambers. The piston rod has a proximal end portion thereof fixed to the piston and a distal end portion thereof extending to an outside of the cylinder, and the piston rod includes a hollow portion. The fluid passage is provided in the piston rod so as to enable communication between the two oil chambers in the cylinder. The damping force adjusting mechanism is provided in the fluid passage so as to vary a flow path area of the fluid passage. The actuator is connected to the distal end portion of the piston rod so as to operate the damping force adjusting mechanism by application of an operating force. The transmission rod extends axially in the hollow portion of the piston rod so as to transmit the operating force of the actuator to the damping force adjusting mechanism. The air spring is provided between the cylinder and the distal end portion of the piston rod, and the air spring forms an air chamber for containing air.

A characteristic feature of the air suspension apparatus of the present invention resides in that the actuator includes a movable inner wall defining a pressure-receiving chamber for receiving an air pressure on a side of the distal end portion of the piston rod. The movable inner wall is adapted to be displaced according to the air pressure in the pressure-receiving chamber, to thereby operate the damping force adjusting mechanism through the transmission rod, and the piston rod includes an air passage for introducing the pressure of air in the air chamber to the pressure-receiving chamber in the actuator so as to displace the movable inner wall.

By this arrangement, when the pressure in the air chamber of the air spring changes in accordance with the load carried by the vehicle, this change in pressure is introduced into the pressure-receiving chamber in the actuator through the air passage in the piston rod. Consequently, the movable inner wall in the actuator is displaced in accordance with the pressure in the air chamber and the pressure-receiving chamber. An operating force from the actuator is transmitted through the transmission rod to the damping force adjusting mechanism, according to displacement of the movable inner wall. Therefore, the damping force adjusting mechanism is operated, to thereby change the flow path area of the fluid passage. Thus, the damping force is varied automatically in accordance with the weight of the vehicle.

Further, because the air passage enabling communication between the air chamber of the air spring and the pressure-receiving chamber in the actuator is formed in the piston rod, the air pressure in the air chamber can be introduced into the pressure-receiving chamber through the air passage in the piston rod. This eliminates the need to use an external pipe.

The present invention also provides an air suspension apparatus comprising an air spring including an air chamber, and which is provided between a body and an axle of a vehicle; and a hydraulic shock absorber provided adjacent to the air spring so as to damp vibration of the air spring.

The hydraulic shock absorber includes a cylinder, a piston, a piston rod, a main fluid passage, a main damping force generating device, a sub fluid passage, a sub damping force generating device, a shutter device, and an actuator device.

The piston is slidably provided in the cylinder so as to define an interior of the cylinder into a first oil chamber and a second oil chamber. The piston rod has a proximal end portion thereof connected to the piston and a distal end portion thereof extending to an outside of the cylinder. The main fluid passage is formed in the piston so as to permit flow of a hydraulic fluid between the first oil chamber and the second oil chamber. The main damping force generating device is provided in the piston so as to generate a damping force by imparting a resistance to the hydraulic fluid flowing through the main fluid passage. The sub fluid passage provided in the piston rod permits flow of the hydraulic fluid between the first oil chamber and the second oil chamber. The sub damping force generating device is provided in the piston rod so as to generate a damping force by imparting a resistance to the hydraulic fluid flowing through the sub fluid passage. The shutter device is provided in the sub fluid passage so as to vary a flow path area of the sub fluid passage; and the actuator device is adapted to operate the shutter device according to a weight of the vehicle.

The foregoing and other objects, features and advantages of the present invention will be apparent from the following detailed description and appended claims taken in connection with the accompanying drawings.

Figure 1:
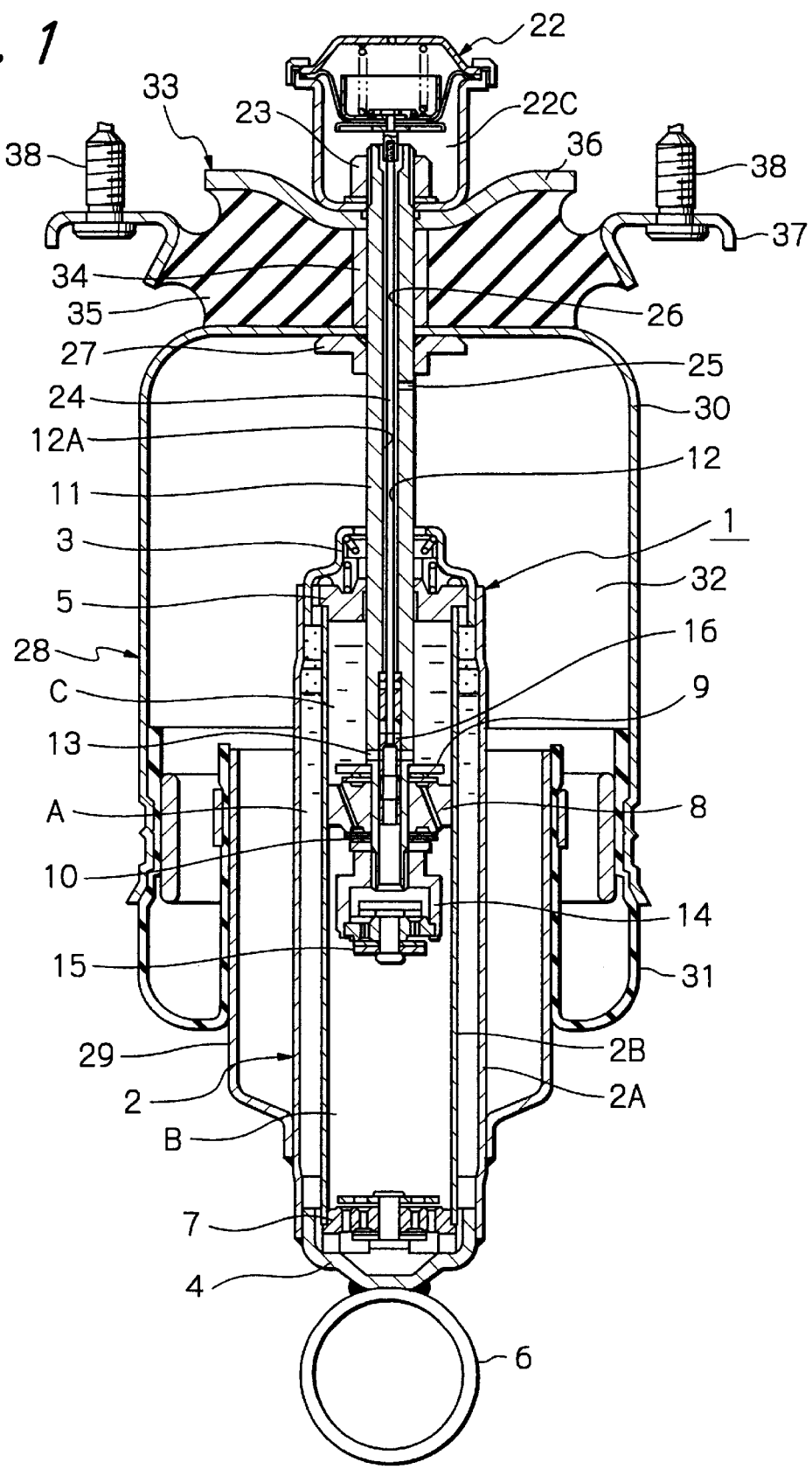
FIG. 1 is a longitudinal cross-sectional view of an air suspension apparatus according to a first embodiment of the present invention.

Before embodiments of the present invention are explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE INVENTION

Hereinbelow, an air suspension apparatus of the present invention is described in detail, referring to the accompanying drawings.

FIGS. 1 to 4 show an air suspension apparatus according to a first embodiment of the present invention. Reference numeral 1 denotes a hydraulic shock absorber acting as the air suspension apparatus. The hydraulic shock absorber 1 generally comprises a cylinder 2, a piston 8, a piston rod 11, oil holes 13, a shutter 16, an actuator 22, a transmission rod 24, an air passage 26, etc., which will be described later.

The cylinder 2 provides the contour of the hydraulic shock absorber 1. The cylinder 2 is a dual cylinder comprising an outer cylinder 2A and an inner cylinder 2B provided in a coaxial relationship with the outer cylinder 2A. An annular reservoir A is formed between the outer cylinder 2A and the inner cylinder 2B. An upper end of the outer cylinder 2A is closed by an upper cap 3 and a bottom end of the outer cylinder 2A is closed by a bottom cap 4.

A stepped cylindrical rod guide 5 is provided in the upper cap 3. The inner cylinder 2B is positioned in the outer cylinder 2A between the rod guide 5 and a valve housing 7A of a bottom valve 7 (the bottom valve 7 and the valve housing 7A will be described later). An eyebolt 6 for mounting of the cylinder 2 on an axle of a vehicle is fixed to the bottom cap 4 by welding.

Figure 2:
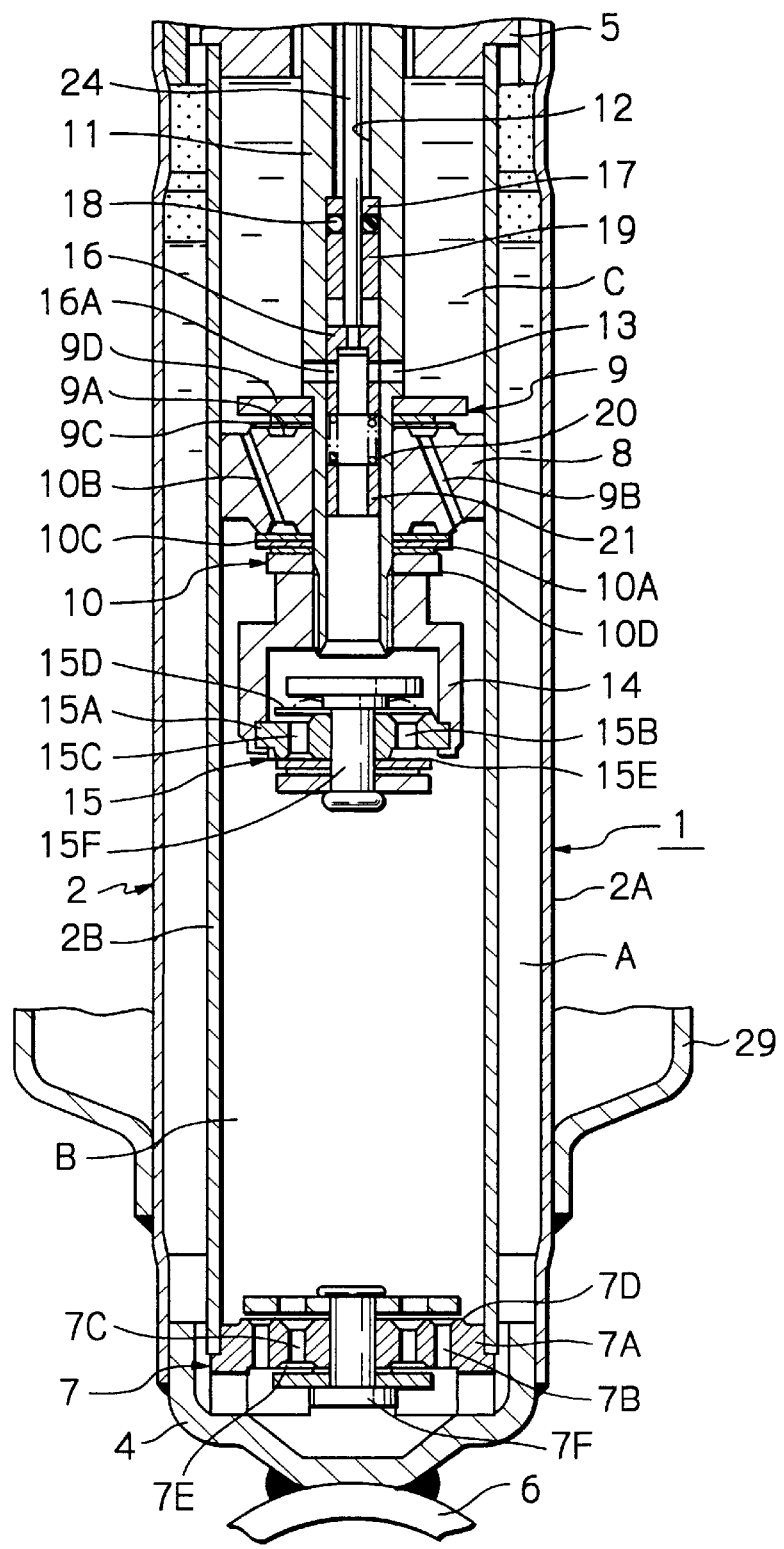
FIG. 2 is an enlarged longitudinal cross-sectional view of a cylinder, a piston, a bottom valve, etc. shown in FIG. 1.

The bottom valve 7 is provided between the inner cylinder 2B and the bottom cap 4. As shown in FIG. 2, the bottom valve 7 includes: the valve housing 7A in the form of a stepped circular plate; first fluid passages 7B, 7B and second fluid passages 7C, 7C formed in the valve housing 7A; a check valve 7D for opening and closing each second fluid passage 7C, and which is provided on an upper surface of the valve housing 7A; a disk valve 7E for opening and closing each first fluid passage 7B, and which is provided on a bottom surface of the valve housing 7A; a pin 7F for fixing the check valve 7D and the disk valve 7E to the valve housing 7A; etc.

During an extension stroke of the piston rod 11 (described later), a hydraulic fluid (hereinafter, frequently referred to simply as "the fluid") in the reservoir A opens the check valve 7D of the bottom valve 7 and flows from the first fluid passage 7B into a bottom-side oil chamber B. During a compression stroke of the piston rod 11, the check valve 7D is closed to thereby block the first fluid passage 7B, and the fluid in the bottom-side oil chamber B opens the disk valve 7E and flows from the second fluid passage 7C into the reservoir A. In this instance, the disk valve 7E imparts a resistance to the fluid passing through the second fluid passage 7C, to thereby generate a predetermined damping force.

The piston 8 in a cylindrical form is slidably provided in the inner cylinder 2B. The piston 8 divides an interior of the inner cylinder 2B into the bottom-side oil chamber B and a rod-side oil chamber C. A main damping force generating mechanism 9 for the compression stroke and a main damping force generating mechanism 10 for the extension stroke are provided in the piston 8.

Figure 3:
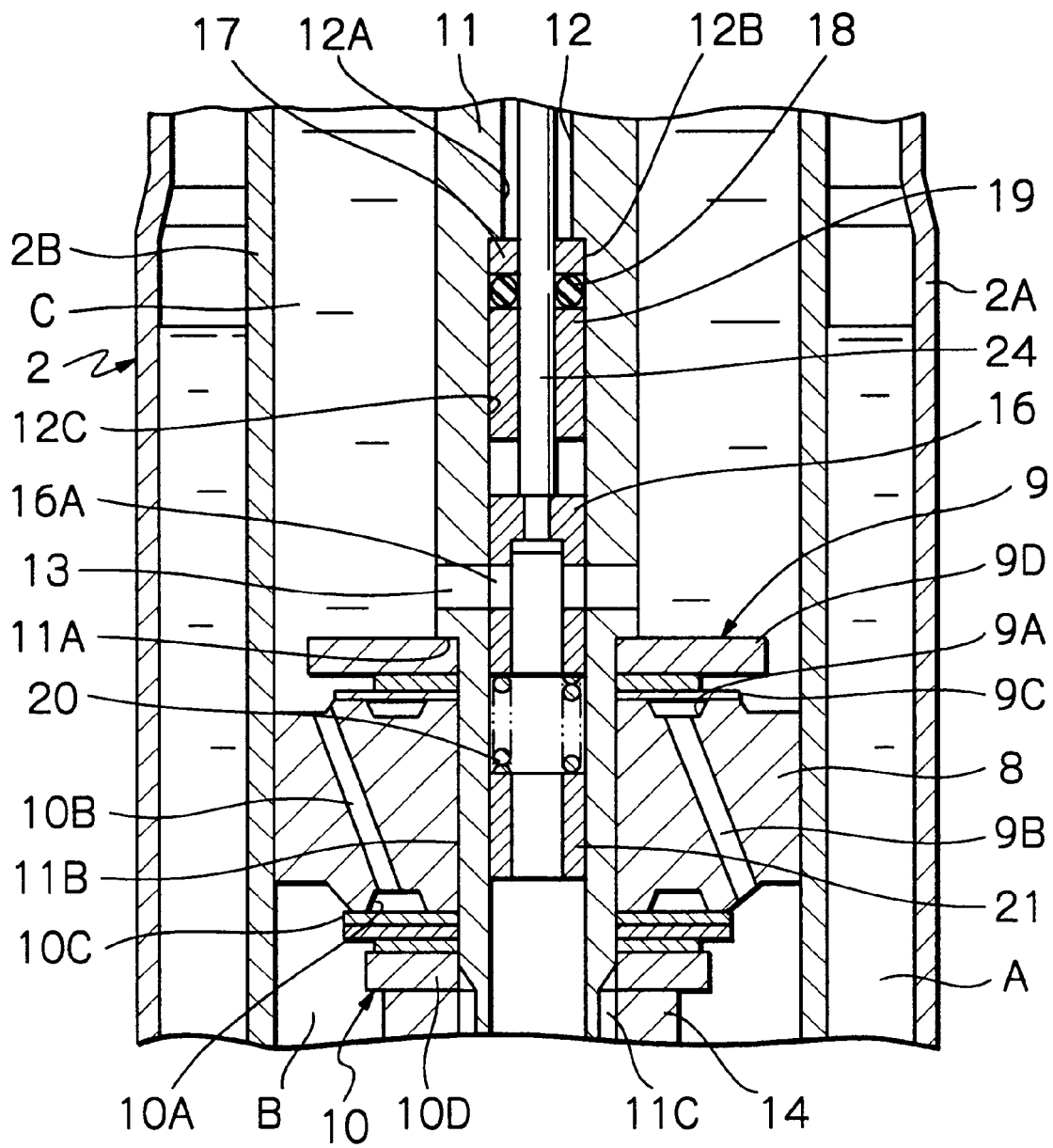
FIG. 3 is an enlarged longitudinal cross-sectional view of the piston, a piston rod, a shutter, a transmission rod, etc. shown in FIG. 2.

As shown in FIG. 3, the main damping force generating mechanism 9 (for the compression stroke) provided in the piston 8 comprises: an annular groove 9A formed on an upper surface of the piston 8; a fluid passage 9B enabling the annular groove 9A to communicate with the bottom-side oil chamber B; a disk valve 9C for opening and closing the annular groove 9A; a retainer 9D for restricting a maximum degree of opening of the disk valve 9C; etc.

The main damping force generating mechanism 10 (for the extension stroke) provided in the piston 8 has substantially the same structure as the main damping force generating mechanism 9. The main damping force generating mechanism 10 comprises: an annular groove 10A formed on a bottom surface of the piston 8; a fluid passage 10B enabling the annular groove 10A to communicate with the rod-side oil chamber C; a disk valve 10C for opening and closing the annular groove 10A; a retainer 10D for restricting a maximum degree of opening of the disk valve 10C; etc.

The main damping force generating mechanisms 9 and 10, together with the piston 8, are connected to a small-diameter portion 11B of the piston rod 11.

The piston rod 11 has a proximal end portion thereof connected to the piston 8 and a distal end portion thereof protruding through the rod guide 5 to the outside of the cylinder 2. The proximal end portion of the piston rod 11 forms the small-diameter portion 11B continued to a stepped portion 11A. A threaded portion 11C is formed at an end portion of the small-diameter portion 11B. A threaded portion 11D is formed at the distal end portion of the piston rod 11. The piston rod 11 has a hollow structure including a rod insertion hole 12 extending through a central portion thereof.

The rod insertion hole 12 is a through-hole axially extending through the central portion of the piston rod 11. The rod insertion hole 12 comprises a small-diameter hole 12A and a large-diameter hole 12C. The small-diameter hole 12A extends from a position near the proximal end portion of the piston rod 11 to a distal end of the piston rod 11. A stepped portion 12B is provided on a proximal end of the small-diameter hole 12A, and the large-diameter hole 12C having a larger diameter than the small-diameter hole 12A extends from the stepped portion 12B. The small-diameter hole 12A of the rod insertion hole 12, together with an air hole 25 (described later), provides the air passage 26. The small-diameter hole 12A has a diameter such that a sufficiently large passage can be ensured between the transmission rod 24 and the rod insertion hole 12 when the transmission rod 24 is inserted into the rod insertion hole 12.

The oil holes 13, 13 are two oil holes radially formed in the piston rod 11. Each oil hole 13 is positioned above the stepped portion 11A. The rod-side oil chamber C and the large-diameter hole 12C of the rod insertion hole 12 communicate with each other through the oil hole 13. The oil holes 13, 13, together with the large-diameter hole 12C of the rod insertion hole 12, provide a fluid passage.

Reference numeral 14 denotes a cylindrical nut threadably engaged with the threaded portion 11C of the piston rod 11. The nut 14 fixes the piston 8 provided on the small-diameter portion 11B of the piston rod 11 and the main damping force generating mechanisms 9 and 10, which are axially arranged, between the nut 14 and the stepped portion 11A, while supporting a sub damping force generating mechanism 15.

The sub damping force generating mechanism 15 is connected to the nut 14. The sub damping force generating mechanism 15 comprises: a valve housing 15A fixed to the nut 14 by staking, crimping or clamping; a first fluid passage 15B and a second fluid passage 15C formed in the valve housing 15A; a check valve 15D for opening and closing the first fluid passage 15B, which is provided on an upper surface of the valve housing 15A; a disk valve 15E for opening and closing the second fluid passage 15C, which is provided on a bottom surface of the valve housing 15A; a pin 15F for fixing the check valve 15D and the disk valve 15E to the valve housing 15A; etc.

During the compression stroke of the piston rod 11, the fluid in the bottom-side oil chamber B opens the check valve 15D and flows from the first fluid passage 15B into the rod-side oil chamber C through oil holes 13. During the extension stroke of the piston rod 11, the check valve 15D is closed to thereby block the first fluid passage 15B, and the fluid in the rod-side oil chamber C opens the disk valve 15E and flows from the second fluid passage 15C into the bottom-side oil chamber B. In this instance, the disk valve 15E imparts a resistance to the fluid passing through the second fluid passage 15C, to thereby generate a predetermined damping force. It should be noted that the damping force generated by the disk valve 15E is set to a value smaller than the damping force generated by the main damping force generating mechanism 10 (for the extension stroke) provided in the piston 8.

The shutter 16 is provided in the large-diameter hole 12C of the rod insertion hole 12 so as to be slidable in an axial direction. The shutter 16 serves as a damping force adjusting mechanism. The shutter 16 is in the form of a cylinder having an upper end thereof closed and includes shutter holes 16A, 16A which extend radially so as to be capable of communicating with the oil holes 13, 13. When the shutter hole 16A of the shutter 16 communicates with the oil hole 13, the fluid in the rod-side oil chamber C flows through the oil hole 13, the shutter hole 16A and the large-diameter hole 12C into the sub damping force generating mechanism 15. The fluid further flows from the sub damping force generating mechanism 15 into the bottom-side oil chamber B. Thus, some of the fluid bypasses the main damping force generating mechanisms 9 and 10, and passes through the sub damping force generating mechanism 15. Therefore, only a small resistance is imparted to the fluid, to thereby generate a small damping force.

On the other hand, when the shutter 16 is displaced upward to thereby close the oil hole 13, the flow of fluid between the rod-side oil chamber C and the bottom-side oil chamber B is conducted only through the damping force generating mechanisms 9 and 10 provided in the piston 8. Therefore, the damping force generated at this time is a large damping force generated by the damping force generating mechanisms 9 and 10.

Reference numeral 17 denotes a bearing by which the transmission rod 24 is slidably supported. The bearing 17 is provided in the large-diameter hole 12C while being in contact with the stepped portion 12B of the rod insertion hole 12. Reference numeral 18 denotes an O-ring provided below the bearing 17 for hermetically sealing a space between the O-ring 18 and the transmission rod 24. Reference numeral 19 denotes a bushing provided below the O-ring 18 for axially positioning the O-ring 18.

Reference numeral 20 denotes a coil spring provided below the shutter 16 and reference numeral 21 denotes a bushing which prevents the coil spring 20 from becoming displaced. The coil spring 20 suppresses an impact generated by downward displacement of the shutter 16. Further, when the shutter 16 is displaced downward, the coil spring 20 aligns the shutter 16 with a position such that the shutter hole 16A communicates with the oil hole 13.

Figure 4:
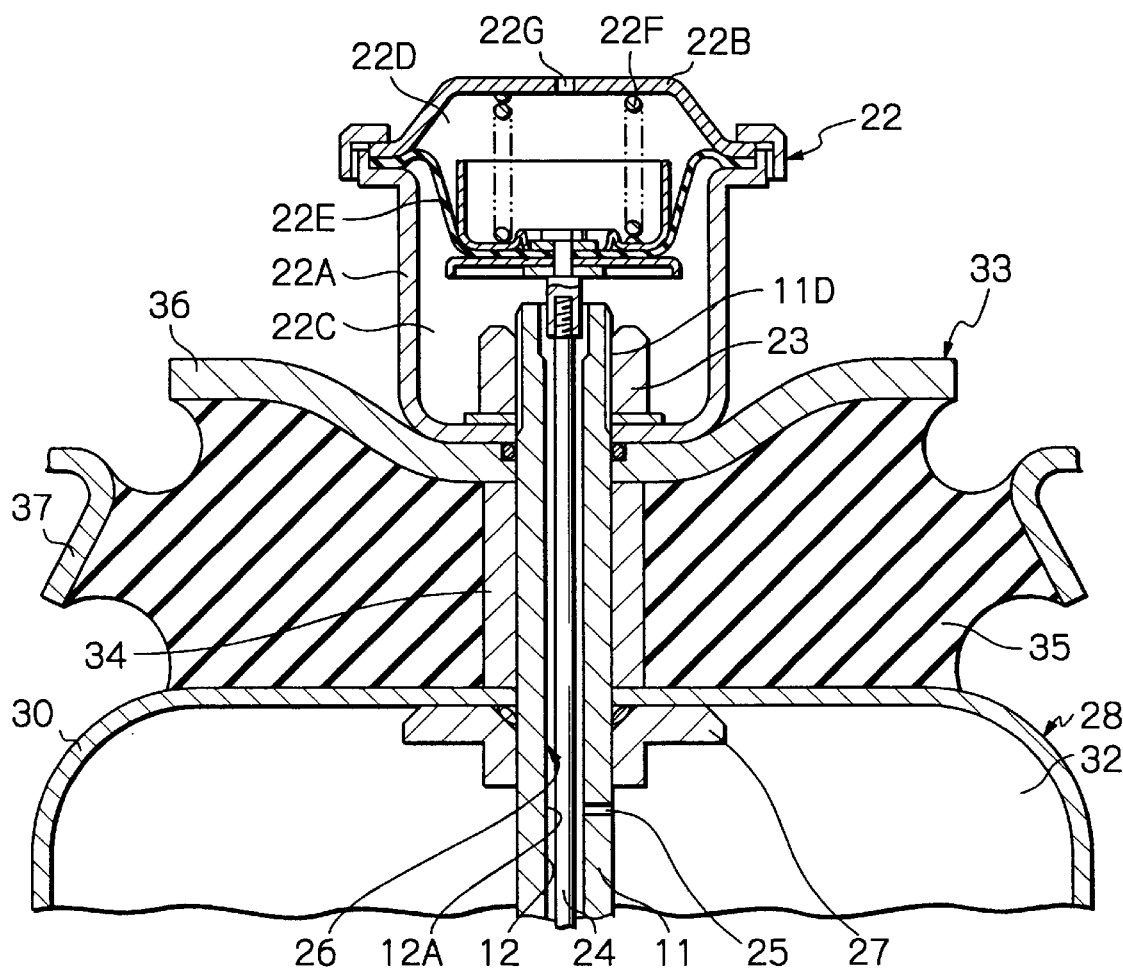
FIG. 4 is an enlarged longitudinal cross-sectional view of an actuator, an air passage, a part of an air spring, etc. shown in FIG. 1.

The actuator 22 is connected to the protruding end portion, of the piston rod 11. As shown in FIG. 4, the actuator 22 generally comprises: a lower case 22A in the form of a bottomed cylinder; an upper case 22B which closes the lower case 22A; a diaphragm 22E having an outer peripheral portion thereof hermetically sandwiched between the lower case 22A and the upper case 22B; and a set spring 22F. The diaphragm 22E is a movable inner wall which divides a space enclosed by the lower case 22A and the upper case 22B into a lower pressure-receiving chamber 22C and an upper spring chamber 22D. The spring chamber 22D is open to the atmosphere through a hole 22G formed in the upper case 22B. The set spring 22F is provided in the spring chamber 22D so as to apply force to the diaphragm 22E in a downward direction.

The pressure-receiving chamber 22C communicates with an air chamber 32 of an air spring 28 through the air passage 26 comprising the small-diameter hole 12A of the rod insertion hole 12 and the air hole 25 (described later).

When the vehicle has a normal weight (when the vehicle is lightweight with no luggage or the like being loaded thereon), the set spring 22F displaces the diaphragm 22E downward against the pressure in the air chamber 32, that is, the pressure in the pressure-receiving chamber 22C. When luggage or the like is loaded on the vehicle, the vehicle is lowered in height. In order to return the vehicle height to its original level, compressed air is supplied from a compressor (not shown) to the air chamber 32. Consequently, the pressure in the air chamber 32 and the pressure-receiving chamber 22C increases. The force of the set spring 22F is set to a value such that upward displacement of the diaphragm 22E is permitted due to the effect of pressure in the pressure-receiving chamber 22C.

The bottom of the lower case 22A of the actuator 22, together with a mounting member 33 (described later), is fixed to the piston rod 11 by means of a nut 23 threadably engaged with the threaded portion 11D.

The transmission rod 24 extends in the rod insertion hole 12 of the piston rod 11 so as to be capable of moving axially in the rod insertion hole 12. A bottom end portion of the transmission rod 24 is fixed to the shutter 16 and an upper end portion of the transmission rod 24 is fixed to a central portion of the diaphragm 22E of the actuator 22. Therefore, when displacement of the diaphragm 22E occurs, the transmission rod 24 displaces the shutter 16 in a vertical direction in accordance with the amount of displacement (or the operating force) of the diaphragm 22E.

The air hole 25 is formed in the piston rod 11 at a position near the distal end portion thereof. The air hole enables the air chamber 32 of the air spring 28 to communicate with the small-diameter hole 12A of the rod insertion hole 12. The air hole 25, together with the small-diameter hole 12A of the rod insertion hole 12, forms the air passage 26 which enables the air chamber 32 to communicate with the pressure-receiving chamber 22C in the actuator 22. The air hole 25 forms an orifice. A flow path area of the air hole 25 is smaller than that of the small-diameter hole 12A. Therefore, at the time of occurrence of a slight or vigorous change in pressure in the air chamber 32, displacement of the diaphragm 22E due to this change is restricted by the air hole 25.

Reference numeral 27 denotes a stopper connected to the piston rod 11 above the air hole 25. The stopper 27 and the nut 23 hold the mounting member 33 (described later) therebetween. The stopper 27 is fixed, by welding, to an outer circumferential surface of the piston rod 11.

The air spring 28 is provided between the cylinder 2 and the protruding end portion of the piston rod 11. The air spring 28 generally comprises: a cylindrical member 29 fixed, by welding, to an outer circumferential surface of the outer cylinder 2A of the cylinder 2; a cylindrical shell 30 having an upper end thereof closed, which is connected to the protruding end portion of the piston rod 11 so as to face the cylindrical member 29; and a cylindrical rubber member 31 hermetically sealing a space between the cylindrical member 29 and the shell 30 and having flexibility so as to permit relative movement between the cylindrical member 29 and the shell 30.

In the air spring 28, the cylindrical member 29, the shell 30 and the rubber member 31 define the air chamber 32. Compressed air from the compressor is supplied to and discharged from the air chamber 32 through a supply-and-discharge opening (not shown). Thus, the air spring 28 urges the piston rod 11 of the hydraulic shock absorber 1 in a direction of extension.

The mounting member 33 is used for connecting the piston rod 11 to a body of the vehicle. The mounting member 33 generally comprises: a cylinder 34 fitted onto the piston rod 11; a mount rubber 35 formed from a flexible material such as rubber, which is provided on an outer circumferential surface of the cylinder 34; an upper plate 36 provided on an upper surface of the mount rubber 35; and a vehicle body mount portion 37 fixed to an outer circumferential surface of the mount rubber 35. The vehicle body mount portion 37 is connected to the vehicle body by means of a plurality of bolts 38. The mounting member 33, together with the lower case 22A of the actuator 22 and the shell 30, is fixed to the piston rod 11 by means of the nut 23.

The air suspension apparatus in the first embodiment is arranged as mentioned above. Hereinbelow, explanation is made of an operation of the air suspension apparatus in the first embodiment.

When no luggage or the like is loaded on the vehicle, the pressure in the air chamber 32 of the air spring 28 is low. Thus, the pressure in the pressure-receiving chamber 22C in the actuator 22, which communicates with the air chamber 32 through the air passage 26 comprising the small-diameter hole 12A of the rod insertion hole 12 and the air hole 25, is also low. Therefore, the diaphragm 22E of the actuator 22 is displaced downward under the force of the set spring 22F and the transmission rod 24 connected to the diaphragm 22E moves the shutter 16 to a lower position. Thus, the shutter hole 16A of the shutter 16 is communicates with the oil hole 13.

Consequently, during the extension stroke of the piston rod 11, while a part of the fluid in the rod-side oil chamber C flows into the bottom-side oil chamber B through the main damping force generating mechanism 10 provided in the piston 8, a part of the fluid in the rod-side oil chamber C flows into the bottom-side oil chamber B through the oil hole 13, the shutter hole 16A, the large-diameter hole 12C and the sub damping force generating mechanism 15.

On the other hand, during the compression stroke of the piston rod 11, the fluid in the bottom-side oil chamber B opens the check valve 15D of the sub damping force generating mechanism 15 and readily flows through the large-diameter hole 12C of the rod insertion hole 12, the shutter hole 16A and the oil hole 13 into the rod-side oil chamber C.

Thus, when no luggage or the like is loaded on the vehicle, the fluid flows through the main damping force generating mechanism 10 and the sub damping force generating mechanism 15. Therefore, only a small resistance is imparted to the fluid, to thereby generate a small damping force. Therefore, good riding quality of the vehicle can be ensured.

When luggage or the like is loaded on the vehicle, the vehicle is lowered in height due to the weight of luggage. In order to return the vehicle height to its original level, compressed air is supplied from the compressor to the air chamber 32 of the air spring 28. In this instance, the pressure in the pressure-receiving chamber 22C communicated with the air chamber 32 through the air passage 26 increases. Therefore, the diaphragm 22E of the actuator 22 is displaced upward against the force of the set spring 22F and the shutter 16 connected to the diaphragm 22E through the transmission rod 24 is also displaced upward.

Consequently, the shutter hole 16A of the shutter 16 is displaced from the oil hole 13, to thereby close the oil hole 13. Therefore, the flow of fluid between the bottom-side oil chamber B and the rod-side oil chamber C is conducted only through the main damping force generating mechanisms 9 and 10 provided in the piston 8.

Thus, when luggage or the like is loaded on the vehicle, the fluid flows only through the main damping force generating mechanisms 9 and 10. Therefore, a large resistance is imparted to the fluid by the main damping force generating mechanisms 9 and 10, to thereby generate a large damping force. As a result, vibration during running of the vehicle can be suppressed, leading to highly stable running of the vehicle.

As mentioned above, in the first embodiment of the present invention, the pressure-receiving chamber 22C in the actuator 22 and the air chamber 32 of the air spring 28 for displacing the shutter 16 communicate with each other through the air passage 26 comprising the small-diameter hole 12A of the rod insertion hole 12 and the air hole 25.

Therefore, it is unnecessary to use an external pipe such as is used in a conventional air suspension apparatus for enabling communication between the actuator and the air spring. Therefore, a problem such as leakage of air due to connection failure or breakage of the external pipe can be avoided, to thereby stabilize the function of the air suspension apparatus and impart to the air suspension apparatus high reliability and long life.

Further, the air passage 26 is formed by utilizing the piston rod 11, so that it is unnecessary to provide connecting holes for use in connecting the external pipe. This enables a reduction in the number of necessary parts, leading to high productivity and low cost.

Further, the air hole 25 forms an orifice and has a flow path area which is smaller than that of the small-diameter hole 12A of the rod insertion hole 12. Therefore, at the time of occurrence of a slight or vigorous change in pressure in the air chamber 32 during running, displacement of the diaphragm 22E due to this change can be restricted. This prevents undesirable frequent damping force switches, to thereby generate a stable damping force and ensure high reliability of the air suspension apparatus.

Figure 5:
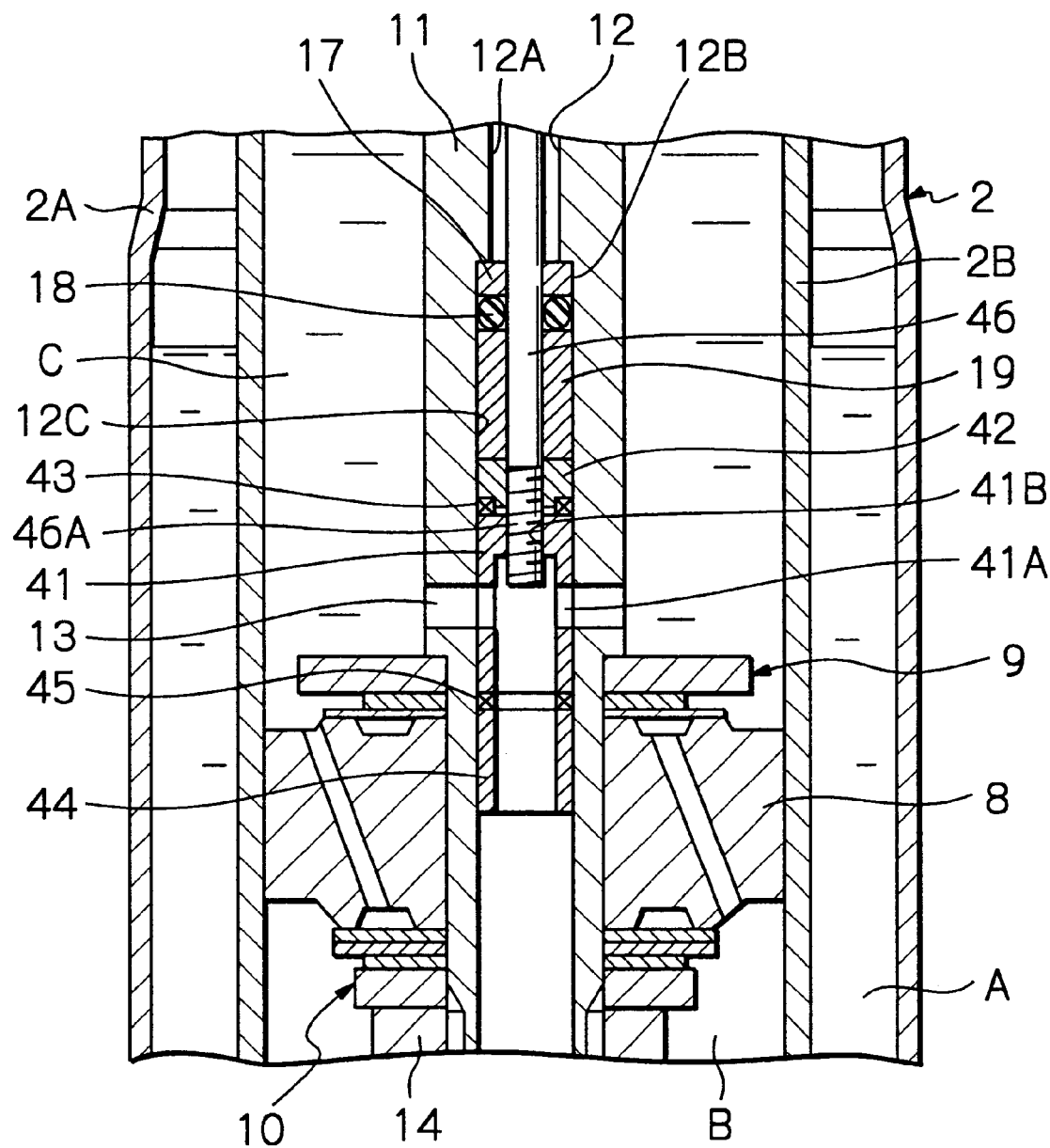
FIG. 5 is a longitudinal cross-sectional view of an air suspension apparatus according to a second embodiment of the present invention, showing a piston, a piston rod, a shutter, a transmission rod, etc.

Next, a second embodiment of the present invention is described, with reference to FIG. 5. The second embodiment of the present invention is characterized in that the oil holes are opened and closed according to rotation of the shutter. In the second embodiment, the same elements as used in the first embodiment are designated by the same reference numerals and characters, and explanation thereof is omitted.

Reference numeral 41 denotes a shutter. The shutter 41 is in substantially the same form as the shutter 16 in the first embodiment, that is, in the form of a cylinder having its upper end closed. The shutter 41 includes shutter holes 41A, 41A formed radially and capable of communicating with the oil holes 13, 13. It should be noted that an internally threaded portion 41B is formed at a central portion of the upper end of the shutter 41 so as to engage with an externally threaded portion 46A of a transmission rod 46 (described later), and that the shutter 41 is rotatable. In these points, the shutter 41 differs from the shutter 16 in the first embodiment.

The internally threaded portion 41B, together with the externally threaded portion 46A, provides a feed screw mechanism and forms a multi-start thread. Thus, when the transmission rod 46 connected to the shutter 41 by engagement between the internally threaded portion 41B and the externally threaded portion 46A is vertically displaced, the shutter 41 is displaced (rotated) in a circumferential direction.

Reference numeral 42 denotes a cylindrical spacer provided below the busing 19 in the large-diameter hole 12C of the rod insertion hole 12. Reference numeral 43 denotes an upper thrust bearing provided between the spacer 42 and the shutter 41. The thrust bearing 43 restricts upward displacement of the shutter 41 at a position such that the shutter hole 41A is capable of communicating with the oil hole 13. Further, the thrust bearing 43 supports the shutter 41 so as to permit rotation of the shutter 41.

Reference numeral 44 denotes a bushing for preventing displacement, which is fitted at a lower position than the shutter 41 into the large-diameter hole 12C of the rod insertion hole 12. Reference numeral 45 denotes a lower thrust bearing provided between the bushing 44 and the shutter 41. The thrust bearing 45 restricts downward displacement of the shutter 41, while supporting the shutter 41 so as to permit rotation thereof.

The transmission rod 46 axially extends in the rod insertion hole 12 and has an upper end thereof fixed to the diaphragm 22E of the actuator 22, as in the case of the transmission rod 24 in the first embodiment. However, the transmission rod 46 in the second embodiment differs from the transmission rod 24 in the first embodiment in that a lower end portion of the transmission rod 46 includes the externally threaded portion 46A engageable with the internally threaded portion 41B of the shutter 41.

The transmission rod 46 is capable of moving vertically while being restrained from rotating. Thus, when the transmission rod 46 is vertically displaced by the actuator 22, the shutter 41 having the internally threaded portion 41B engaged with the externally threaded portion 46A is rotated in a circumferential direction. Thus, the shutter hole 41A is brought into and out of communication with the oil hole 13 in accordance with rotation of the shutter 41.

Thus, in the second embodiment, substantially the same effects as those of the first embodiment can be achieved.

In the second embodiment, the transmission rod 46 is axially displaced and the shutter 41 is rotated according to the displacement of the transmission rod 46. However, the present invention is not limited to this embodiment. For example, a rack-and-pinion mechanism may be provided between the actuator at the protruding end portion of the piston rod and the transmission rod so that the transmission rod and the shutter are rotated as a unit according to displacement of the movable inner wall.

Further, in the first and second embodiments, the shutter hole 16A of the shutter 16 and the shutter hole 41A of the shutter 41 communicate with or are removed from the oil hole 13 in the piston rod 11. However, in the present invention, a variable orifice may be formed in the shutter so that the size of the orifice gradually changes and an open area of the oil hole 13 may be controlled by changing the size of the orifice of the shutter.

Further, in the first and second embodiments, as the movable inner wall in the actuator 22, use is made of the diaphragm 22E capable of moving according to the pressure in the pressure-receiving chamber 22C. However, instead of using the diaphragm 22E, a free piston or bellows may be provided as the movable inner wall in the actuator.

Further, in the first and second embodiments, the hydraulic shock absorber 1 includes the dual cylinder 2 comprising the outer cylinder 2A and the inner cylinder 2B. However, in the present invention, the hydraulic shock absorber 1 may be a hydraulic shock absorber utilizing a single cylinder containing a free piston.

As has been described above, according to the present invention, the air chamber of the air spring and the pressure-receiving chamber in the actuator communicate with each other through the air passage provided in the piston rod, so that the movable inner wall of the actuator can be displaced in accordance with the air pressure in the air chamber and the pressure-receiving chamber. Therefore, an external pipe such as is used in a conventional air suspension apparatus is unnecessary. Therefore, a problem such as leakage of air due to connection failure or breakage of the external pipe can be avoided, to thereby stabilize the function of the air suspension apparatus and impart to the air suspension apparatus high reliability and long life. Further, because the air passage is formed by utilizing the piston rod, it is unnecessary to provide connecting holes for use in connecting the external pipe. This enables a reduction in the number of necessary parts, leading to high productivity and low cost.

The entire disclosure of Japanese Patent Application No. 10-363383 filed on Dec. 21, 1998 including specification, claims, drawings and summary is incorporated herein by reference in its entirety.

Various of the features are set forth in the following claims.

What is claimed is:

1. An air suspension apparatus comprising:
    a cylinder;
    a piston slidably provided in the cylinder so as to divide and interior of the cylinder into two oil chambers;
    a piston rod having a proximal end portion thereof fixed to the piston and a distal end portion thereof extending to an outside of the cylinder, the piston rod including a hollow portion;
    a fluid passage provided in the piston rod so as to enable communication between the two oil chambers in the cylinder;
    a damping force adjusting mechanism provided in the fluid passage so as to vary a flow path area of the fluid passage;
    an actuator connected to the distal end portion of the piston rod so as to operate the damping force adjusting mechanism by application of an operating force;
    a transmission rod extending axially in the hollow portion of the piston rod so as to transmit the operating force of the actuator to the damping force adjusting mechanism; and
    an air spring provided between the cylinder and the distal end portion of the piston rod, the air spring forming an air chamber for containing air,
    wherein the actuator includes a movable inner wall defining a pressure-receiving chamber for receiving air pressure on a side of the distal end portion of the piston rod, the movable inner wall being adapted to be displaced according to the air pressure in the pressure-receiving chamber, to thereby operate the damping force adjusting mechanism through the transmission rod, and wherein the piston rod includes an air passage for introducing pressure of air in the air chamber to the pressure-receiving chamber in the actuator so as to displace the movable inner wall.

2. An air suspension apparatus comprising:
    an air spring including an air chamber, which is provided between a body and an axle of a vehicle; and
    a hydraulic shock absorber provided adjacent to the air spring so as to dampen vibration of the air spring, the hydraulic shock absorber including:
        a cylinder;
        a piston slidably provided in the cylinder so as to divide an interior of the cylinder into a first oil chamber and a second oil chamber;
        a piston rod having a proximal end portion thereof connected to the piston and a distal end portion thereof extending to an outside of the cylinder;
        a main fluid passage formed in the piston so as to permit flow of a hydraulic fluid between the first oil chamber and the second oil chamber;
        a main damping force generating device provided in the piston so as to generate a damping force by imparting a resistance to the hydraulic fluid flowing through the main fluid passage;
        a sub fluid passage provided in the piston rod so as to permit flow of the hydraulic fluid between the first oil chamber and the second oil chamber, the sub fluid passage including a hollow portion extending in a longitudinal direction of the piston rod and including an oil hole formed on a side of the distal end portion of the piston rod so as to enable communication between the second oil chamber and the hollow portion;
        a sub damping force generating device provided in the piston rod so as to generate a damping force by imparting a resistance to the hydraulic fluid flowing through the sub fluid passage;
        a shutter device provided in the hollow portion of the sub fluid passage at a position adjacent to the oil hole, and being adapted to vary a flow path area of the sub fluid passage; and
        an actuator device adapted to operate the shutter device according to a weight of the vehicle.

3. An air suspension apparatus according to claim 2, wherein the shutter device includes a shutter hole for enabling communication between the oil hole and the hollow portion.

4. An air suspension apparatus according to claim 3, wherein the shutter device is provided in the hollow portion so as to be capable of moving between an open position and a closed position, the shutter device at the open position enabling alignment of the oil hole with the shutter hole so as to allow communication between the second oil chamber and the hollow portion, the shutter device at the closed position enabling misalignment of the oil hole with the shutter hole so as to prevent communication between the second oil chamber and the hollow portion.

5. An air suspension apparatus according to claim 4, wherein the shutter device is provided so as to be capable of moving along the hollow portion.

6. An air suspension apparatus according to claim 4, wherein the shutter device is provided so as to be capable of rotating in the hollow portion.

7. An air suspension apparatus according to claim 4, wherein the actuator device includes:
    a transmission rod extending in the hollow portion in the longitudinal direction of the piston rod, the transmission rod having a proximal end portion thereof engaged with the shutter device and a distal end portion thereof extending to the outside of the cylinder;

a detecting device adapted to detect a pressure in the air chamber of the air spring; and an operator provided on the distal end portion of the piston rod so as to be capable of applying pressure to the transmission rod according to the pressure detected by the detecting device so as to move the transmission rod reciprocally in the hollow portion.

8. An air suspension apparatus according to claim 7, wherein the proximal end portion of the transmission rod is fixed to the shutter device.

9. An air suspension apparatus according to claim 7, wherein the proximal end portion of the transmission rod is threadably engaged with the shutter device.

10. An air suspension apparatus according to claim 7, wherein the detecting device is provided in the piston rod and wherein the detecting device includes a transmission path for transmitting a pressure of air in the air chamber to the operator.

11. An air suspension apparatus according to claim 8, wherein the transmission path includes: an air passage defined between an inner wall surface of the piston rod and the transmission rod; and an air hole formed in the piston rod so as to enable communication between the air chamber and the air passage.

12. An air suspension apparatus according to claim 11, wherein the operator includes:

a movable inner wall provided therein so as to divide an interior of the operator into a spring chamber and a pressure-receiving chamber; and a spring provided in the spring chamber so as to urge the movable inner wall toward the pressure-receiving chamber and wherein the distal end portion of the transmission rod is connected to the movable inner wall.

13. An air suspension apparatus according to claim 12, wherein the air passage and the air hole enable communication between the air chamber and the pressure-receiving chamber.

14. An air suspension apparatus according to claim 12, wherein the movable inner wall comprises a diaphragm and wherein the spring applies force to the diaphragm to urge the transmission rod in a direction of the proximal end portion thereof.

15. An air suspension apparatus according to claim 14, wherein the air passage has a first opening open to the air chamber through the air hole and a second opening open to the pressure-receiving chamber so as to transmit the pressure in the air chamber to the pressure-receiving chamber, whereby when the pressure in the air chamber is high, a pressure in the pressure-receiving chamber becomes high, so that the diaphragm enables extension of the transmission rod against force of the spring, to thereby move the shutter device to the closed position so as to close the sub fluid passage, thus effecting flow of the hydraulic fluid only through the main damping force generating device and when the pressure in the air chamber is low, the pressure in the pressure-receiving chamber becomes low, so that the diaphragm enables retraction of the transmission rod under the force of the spring, to thereby move the shutter device to the open position so as to open the sub fluid passage, thus effecting flow of the hydraulic fluid through the main damping force generating device and the sub damping force generating device.

16. An air suspension apparatus according to claim 2, wherein the actuator device includes:

a transmission rod provided in the piston rod so as to be capable of moving in a longitudinal direction of the piston rod, the transmission rod having a proximal end portion thereof engaged with the shutter device and a distal end portion thereof extending to the outside of the cylinder;

a detecting device adapted to detect a pressure in the air chamber of the air spring; and an operator provided on the distal end portion of the piston rod so as to be capable of applying pressure to the transmission rod according to the pressure detected by the detecting device so as to move the transmission rod reciprocally in the hollow portion.

17. An air suspension apparatus according to claim 16, wherein the detecting device is provided in the piston rod and wherein the detecting device includes a transmission path for transmitting a pressure of air in the air chamber to the operator.

18. An air suspension apparatus according to claim 17, wherein the transmission path includes: an air passage defined between an inner wall surface of the piston rod and the transmission rod; and an air hole formed in the piston rod so as to enable communication between the air chamber and the air passage.

19. An air suspension apparatus according to claim 18, wherein the actuator includes:

a movable inner wall provided therein so as to divide an interior of the operator into a spring chamber and a pressure-receiving chamber; and a spring provided in the spring chamber so as to urge the movable inner wall toward the pressure-receiving chamber and wherein the distal end portion of the transmission rod is connected to the movable inner wall.

20. An air suspension apparatus according to claim 19, wherein the air passage and the air hole enable communication between the air chamber and the pressure-receiving chamber.

21. An air suspension apparatus according to claim 20, wherein the movable inner wall comprises a diaphragm and wherein the spring applies force to the diaphragm to urge the transmission rod in a direction of the proximal end portion thereof.

22. An air suspension apparatus according to claim 21, wherein the air passage has a first opening open to the air chamber through the air hole and a second opening open to the pressure-receiving chamber so as to transmit the pressure in the air chamber to the pressure-receiving chamber, whereby when the pressure in the air chamber is high, a pressure in the pressure-receiving chamber becomes high, so that the diaphragm enables extension of the transmission rod against force of the spring, to thereby move the shutter device to the closed position for closing the sub fluid passage, thus effecting flow of the hydraulic fluid only through the main damping force generating device and when the pressure in the air chamber is low, the pressure in the pressure-receiving chamber becomes low, so that the diaphragm enables retraction of the transmission rod under the force of the spring, to thereby move the shutter device to the open position for opening the sub fluid passage, thus effecting flow of the hydraulic fluid through the main damping force generating device and the sub damping force generating device.

23. An air suspension apparatus according to claim 2, wherein the main damping force generating device includes a main damping force generating mechanism for the compression stroke of the piston rod and a main damping force generating mechanism for the extension stroke of the piston rod, which are provided in the piston.

24. An air suspension apparatus according to claim 2, wherein the shutter device is provided in the sub fluid passage between the second oil chamber and the sub damping force generating device.

25. An air suspension apparatus comprising:
- an air spring including an air chamber, which is provided between a body and an axle of a vehicle; and
- a hydraulic shock absorber provided adjacent to the air spring so as to dampen vibration of the air spring, the hydraulic shock absorber including:
  - a cylinder;
  - a piston slidably provided in the cylinder so as to divide an interior of the cylinder into a first oil chamber and a second oil chamber;
  - a piston rod having a proximal end portion thereof connected to the piston, a distal end portion thereof extending to an outside of the cylinder, and a hollow portion extending in a longitudinal direction of the piston rod;
  - a main fluid passage formed in the piston so as to permit flow of a hydraulic fluid between the first oil chamber and the second oil chamber;
  - a main damping force generating device provided in the piston so as to generate a damping force by imparting a resistance to the hydraulic fluid flowing through the main fluid passage;
  - a sub fluid passage provided in the piston rod so as to permit flow of the hydraulic fluid between the first oil chamber and the second oil chamber;
  - a sub damping force generating device provided in the piston rod so as to generate a damping force by imparting a resistance to the hydraulic fluid flowing through the sub fluid passage;
  - a shutter device provided in the sub fluid passage, and being adapted to vary a flow path area of the sub fluid passage; and
  - an actuator device adapted to operate the shutter device according to a weight of the vehicle, the actuator device including:
    - a transmission rod extending in the hollow portion of the piston rod, the transmission rod having a proximal end portion thereof engaged with the shutter device and a distal end portion thereof extending to the outside of the cylinder;
    - a detecting device adapted to detect a pressure in the air chamber of the air spring; and
    - an operator provided on the distal end portion of the piston rod so as to be capable of applying pressure to the transmission rod according to the pressure detected by the detecting device so as to move the transmission rod reciprocally in the hollow portion, the operator including a movable inner wall provided within the operator so as to divide an interior of the operator into a spring chamber and a pressure-receiving chamber, and including a spring provided in the spring chamber so as to urge the movable inner wall toward the pressure-receiving chamber, wherein the distal end portion of the transmission rod is connected to the movable inner wall.

\* \* \* \* \*